United States Patent
Larriba-Andaluz

(10) Patent No.: US 10,801,992 B2
(45) Date of Patent: Oct. 13, 2020

(54) DRIFT TUBES, ION MOBILITY SPECTROMETERS SYSTEMS, AND METHODS OF CLASSIFYING CHARGED PARTICLES

(71) Applicant: Indiana University Research and Technology Corporation, Indianapolis, IN (US)

(72) Inventor: Carlos Larriba-Andaluz, Bargersville, IN (US)

(73) Assignee: Indiana University Research and Technology Corporation, Indianapolis, IN (US)

( * ) Notice: Subject to any disclaimer, the term of this patent is extended or adjusted under 35 U.S.C. 154(b) by 0 days.

(21) Appl. No.: 16/343,313

(22) PCT Filed: Oct. 19, 2017

(86) PCT No.: PCT/US2017/057475
§ 371 (c)(1),
(2) Date: Apr. 18, 2019

(87) PCT Pub. No.: WO2018/075821
PCT Pub. Date: Apr. 26, 2018

(65) Prior Publication Data
US 2020/0182829 A1    Jun. 11, 2020

Related U.S. Application Data

(60) Provisional application No. 62/410,140, filed on Oct. 19, 2016.

(51) Int. Cl.
G01N 27/00    (2006.01)
H01J 49/26    (2006.01)
G01N 27/62    (2006.01)

(52) U.S. Cl.
CPC .................. *G01N 27/622* (2013.01)

(58) Field of Classification Search
CPC .... G01N 27/622; H01J 49/00; H01J 49/0031; H01J 49/0045; H01J 49/005; H01J 49/02; H01J 49/26
(Continued)

(56) References Cited

U.S. PATENT DOCUMENTS 4,886,971 A * 12/1989 Matsumura .............. G21K 5/04
250/492.2
6,586,732 B2   7/2003 Lee et al.
(Continued)

OTHER PUBLICATIONS

International Search Report and Written Opinion issued by the ISA/US Commissioner for Patents, dated Dec. 22, 2017, for International Application No. PCT/US2017/057475.
(Continued)

*Primary Examiner* — Nicole M Ippolito
(74) *Attorney, Agent, or Firm* — Faegre Drinker Biddle & Reath LLP

(57) ABSTRACT

Ion mobility spectrometers and drift tubes including an inlet configured to receive ions, and an outlet, and an internal portion having a pressure at about atmospheric pressure, wherein the drift tube is configured to separate ions using a convective velocity from a carrier gas that transports the ions from the inlet to the outlet, a second controllable velocity that alters a migration of the ions from the inlet to the outlet, and neither radio frequency (RF) nor an alternating current (AC) center the ions are disclosed. Methods of separating charged particles are also disclosed.

21 Claims, 14 Drawing Sheets

(58) Field of Classification Search
USPC .................................... 250/281, 282, 283
See application file for complete search history.

(56) References Cited

U.S. PATENT DOCUMENTS

| | | | |
|---|---|---|---|
| 6,949,739 | B2 | 9/2005 | Franzen |
| 9,459,194 | B2 | 10/2016 | Benner et al. |
| 2011/0198493 | A1 | 8/2011 | Clemmer et al. |
| 2014/0339416 | A1* | 11/2014 | Vidal-de-Miguel .... H01J 9/004 250/282 |

OTHER PUBLICATIONS

Adachi, M., Kousaka, Y. & Okuyama, K. (1985). Unipolar and bipolar diffusion charging of ultrafine aerosol particles. Journal of Aerosol Science 23:123-137.

Adachi, M., Okuyama, K., Kousaka, Y., Moon, S. W. & Seinfeld, J. H. (1990). Facilitated Aerosol Sizing Using the Differential Mobility Analyzer. Aerosol Science and Technology 12:225-239.

Attoui, M., Paragano, M., Cuevas, J. & Fernandez de la Mora, J. (2013). Tandem DMA Generation of Strictly Monomobile 1-3.5 nm Particle Standards. Aerosol Science and Technology 47:499-511.

Dugourd, P., Hudgins, R. R., Clemmer, D. E. & Janold, M. F. (1997). High-resolution ion mobility measurements. Rev Sci Instrum 68:1122-1129.

Fernandez de la Mora, J., de Juan, L., Eichler, T. & Rosell, J. (1998). Differential mobility analysis of molecular ions and nanometer particles. Trac-Trend Anal Chem 17:328-339.

Gopalakrishnan, R., Meredith, M. R., Laniba-Andaluz, C. & Hogan, C. J. (2013a). Brownian Dynamics Determination of the Bipolar Steady State Charge Distribution on Spheres and Non-spheres in the Transition Regime. Journal of Aerosol Science 63:126-145.

Gopalakrishnan, R., Thajudeen, T., Ouyang, H. & Hogan Jr, C. J. (2013b). The Unipolar Diffusion Charging of Arbitrary Shaped Aerosol Particles. Journal of Aerosol Science 64:60-80.

McMurry, P. H. (2000). The history of condensation nucleus counters. Aerosol Science and Technology 33:297-322.

Oberreit, D. R., McMurry, P. H. & Hogan, C. J. (2014a). Analysis of Heterogeneous Vapor Uptake by Nanoparticles via Differential Mobility Analysis-Drift Tube Ion Mobility Spectrometry (DMA-DTIMS). Phys Chem Chem Phys 16:6968-6979.

Oberreit, D. R., McMurry, R H. & Hogan, C. J. (2014b). Mobility Analysis of 2 nm to 11 nm Aerosol Particles with an Aspirating Drift Tube Ion Mobility Spectrometer. Aerosol Science & Technology 48:108-118.

Revercomb, H. E & Mason, E. A. (1975). Theory of Plasma Chromatography Gaseous Electrophoresis—Review. Analytical Chemistry 47:970-983.

Rosser, S. & Fernandez de la Mora, J. (2005). Vienna-type DMA of high resolution and high flow rate. Aerosol Science and Technology 39:1191-1200.

Stolzenburg, M. R. (1988). An Ultrafine Aerosol Size Distribution Measuring System, in Mechanical Engineering, University of Minnesota, Minneapolis, MN.

Stolzenburg, M. R. & McMurry, P. H. (2008). Equations governing single and tandem DMA configurations and a new lognormal approximation to the transfer function. Aerosol Science and Technology 42:421-432.

Ude, S. & Fernandez de la Mora, J. (2005). Molecular monodisperse mobility and mass standards from electrosprays of tetra-alkyl ammonium halides. Journal of Aerosol Science 36: 1224-1237.

Wang, S. C. & Flagan, R. C. (1990). Scanning Electrical Mobility Spectrometer. Aerosol Science and Technology 13:230-240.

* cited by examiner

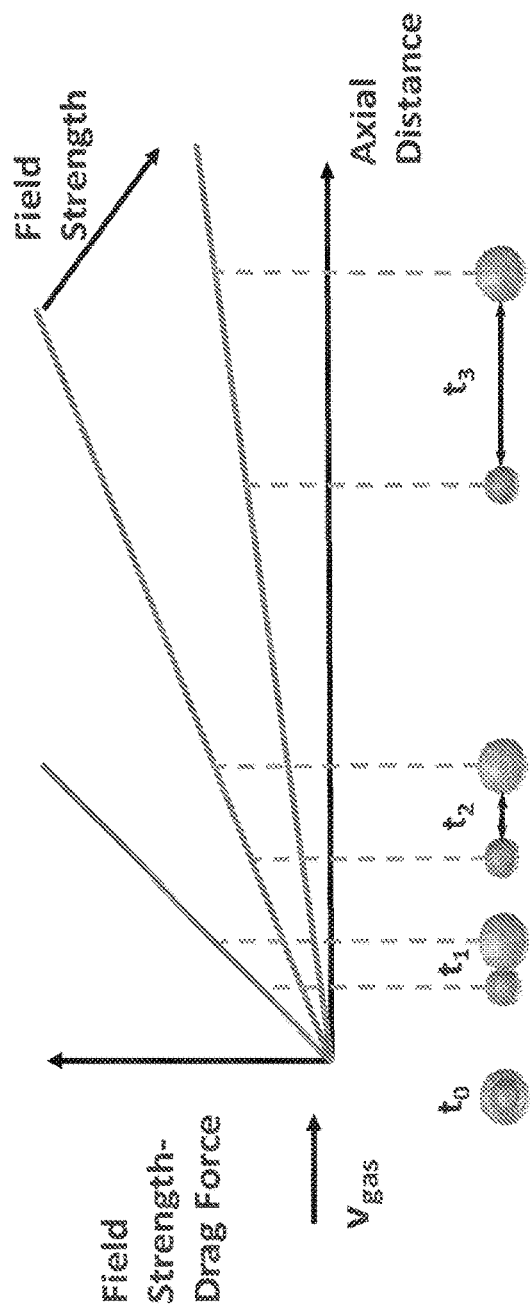
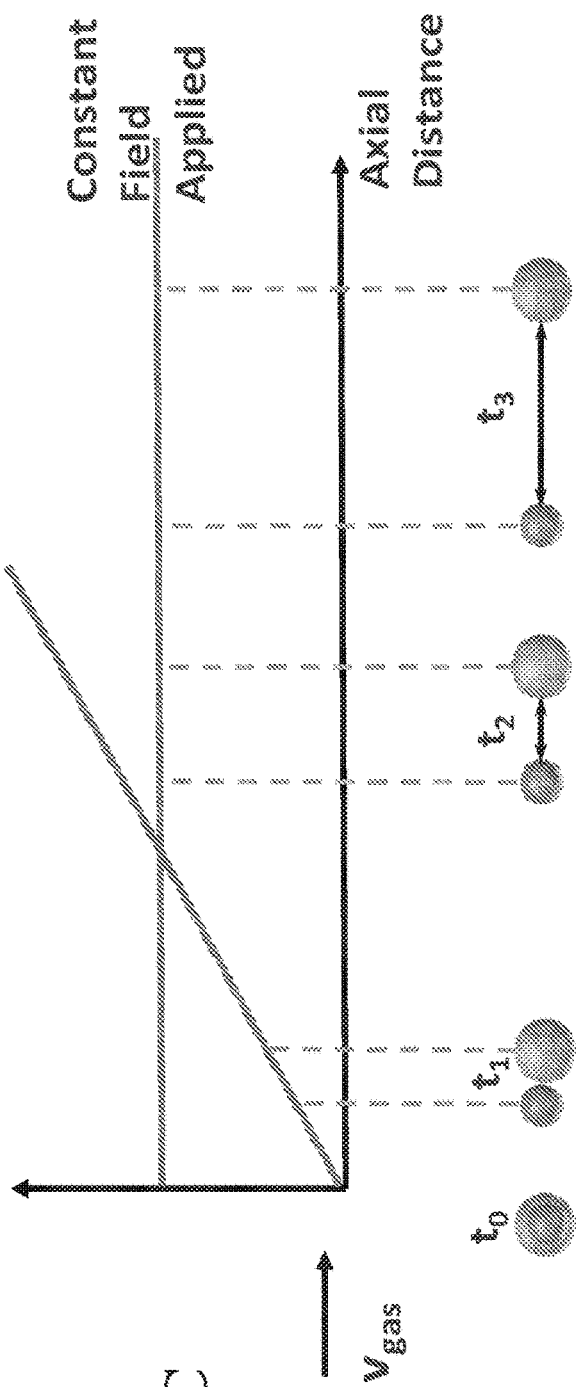
FIG. 4B
FIG. 4C

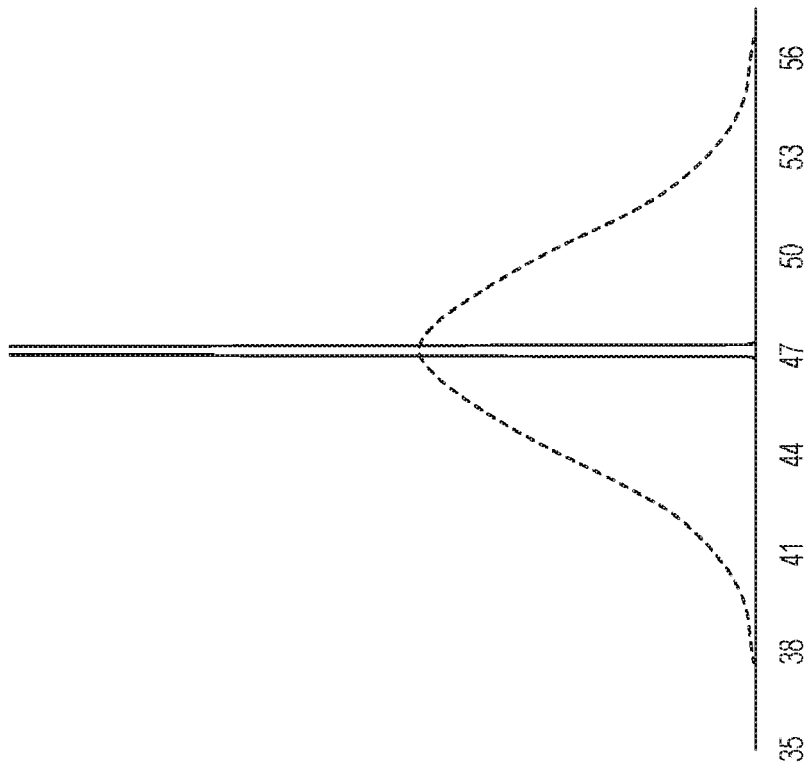
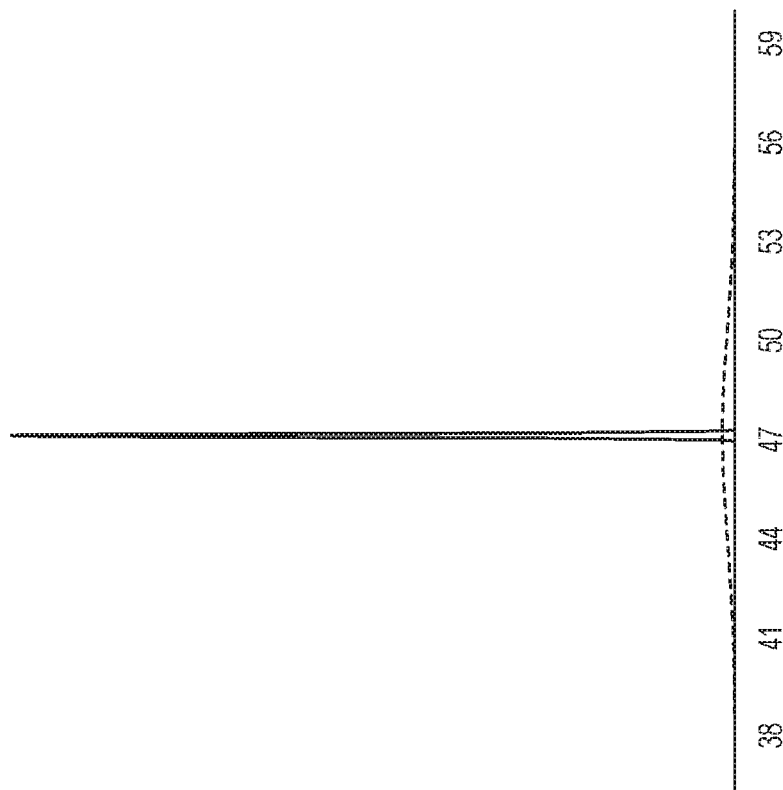

| Nanowires | Diameter (nm) | Radiation (mol/s) | Position of wire 4 (mm) | Peak 1 at 0.5x | Peak 2 at 0.5x | Peak 3 at 0.5x | Peak 4 at 0.5x |
|---|---|---|---|---|---|---|---|
| 5.00E+06 | 20.59 | 5.40E-07 | 5.24 | 7.92 | 25.43 | | |
| 2.00E+07 | 32.69 | 2.35E-07 | 6.65 | 9.97 | 32.38 | | |
| 6.00E+07 | 47.14 | 1.22E-07 | 7.17 | 10.85 | 36.04 | | |
| 1.00E+08 | 55.93 | 9.03E-08 | 7.62 | 11.31 | 37.38 | | |
| 2.00E+08 | 70.42 | 6.03E-08 | 7.51 | 11.61 | 38.45 | | |
| 3.00E+08 | 80.61 | 4.77E-08 | 7.69 | 11.86 | 39.04 | | |
| 5.00E+08 | 95.57 | 3.56E-08 | 7.84 | 12.59 | 39.39 | | |
| 1.00E+09 | 120.42 | 2.41E-08 | 7.86 | 12.66 | 40.15 | 98.14 | |
| Electric Field Slope A (V/mm$^2$) | | | 6.17 | 2.49 | 1.00 | 0.0.50 | |

FIG. 13

DRIFT TUBES, ION MOBILITY SPECTROMETERS SYSTEMS, AND METHODS OF CLASSIFYING CHARGED PARTICLES

CROSS REFERENCE TO RELATED APPLICATIONS

This application is a national phase filing of PCT International Application Serial No. PCT/US2017/057475, filed Oct. 19, 2017, which claims priority to U.S. Provisional Application Ser. No. 62/410,140 entitled DRIFT TUBE TECHNOLOGY, filed on Oct. 19, 2016, the entire disclosures of which are hereby expressly incorporated by reference in their entireties.

FIELD OF THE DISCLOSURE

This disclosure relates to drift tubes and ion classifier systems and methods. More specifically, this disclosure relates to ion mobility spectrometers and drift tubes that do not center the ions with radio frequency or alternating currents.

BACKGROUND

Ion mobility spectrometry is a chemical analyzation technique that ionizes a chemical sample and then sorts the ions, typically based on their size-to-charge ratio. The sample is typically ionized by a charging mechanism. These charged ions are then separated in their mass-to-charge ratios, which is usually accomplished by accelerating them in a drift tube. The separated and charged ions are then detected and are typically displayed as a spectra of both the abundance and size-to-charge ratio. Such spectra can then be compared with known spectra and analyzed to determine the molecule's structure, size, or composition.

Ion mobility spectrometers typically include an ion source or ionizer, a mobility classifier, and a detector. Some mobility classifiers may precede a mass analyzer which classifies by mass with one or more separation techniques, which may include sector field analyzers, time-of-flight analyzers, quadrupole mass analyzers, and ion traps. While mass spectrometers mostly operate a reduced pressure, ion mobility spectrometers may be operated at atmospheric pressure and others may be operated at reduced pressures (e.g., under a partial vacuum).

While many reduced pressure ion traps or ion mobility spectrometers may have the added benefit of reducing the drift of ions from the ion source to the detector, they often require additional equipment to run the sample under a reduced pressure, such as a partial vacuum. Thus, their portability can become somewhat limited, they may be more prone to malfunction, and they may have increased costs.

On the other hand, conventional ion mobility spectrometers that operate at atmospheric pressure tend to have increased ion drift due to the particle's interaction with the gasses present in the mass analyzer.

Moreover, conventional ion mobility analyzers at reduced pressure may suffer from the ability to detect larger particles. Conventional ion trap or ion mobility spectrometers may also suffer from the ability to detect particles larger than about 10 nm.

A need therefore exists to address issues of ion drift in ion mobility analyzers that can be readily transportable and capable of being used in the field rather than at a remote lab.

A need also exists to address issues of ion particle size detection limits.

SUMMARY

The present disclosure provides various drift tubes, ion spectrometers and methods for classifying charged particles. Such systems and methods may allow for improved systems and methods with higher resolutions. Also, such systems and methods described herein may be configured to separate larger ions, such as those having a particle size up to about 100 nm or having a particle size up to about 200 nm.

In some embodiments, drift tubes and ion mobility spectrometers having such drift tubes may include an inlet configured to receive ions, an outlet, and an internal portion having a pressure at about atmospheric pressure, wherein the drift tube is configured to separate ions using a convective velocity from a carrier gas that transports the ions from the inlet to the outlet, a second controllable velocity that alters a migration of the ions from the inlet to the outlet, and neither radio frequency (RF) nor an alternating current (AC) center the ions.

In various embodiments, the force that produces the second controllable velocity is a gravitational force, a centripetal force, a centrifugal force, an electric field force, or a combination thereof. Also, in some embodiments, the force may also increases from the inlet to the outlet, such as linearly. The force that produces the second controllable velocity may alter a velocity of the ions traveling from the inlet of the drift tube to the outlet of the drift tube without stopping the transportation of the ions from the inlet of the drift tube to the outlet of the drift tube. For example, in some embodiments, the force that produces the second controllable velocity is configured to provide a constant velocity of a desired ion.

The direction of the velocities are not particularly limited and in some embodiments, the convective velocity may be in a different than a drift velocity of the ion. For example, in various embodiments, the force that produces the second controllable velocity controls the ions' diffusion in an axial direction of the drift tube, which may be accomplished, for example, through auto-correction. In some embodiments, the force that produces the second controllable velocity and the convective velocity from a carrier gas may control the ions in opposite directions.

Method of classifying charged particles may include forming a plurality of charged particles, transporting the plurality of charged particles in a drift tube, separating the plurality of charged particles using a convective velocity from a carrier gas that transports the plurality of charged particles from an inlet of the drift tube to an outlet of the drift tube and a second controllable velocity that alters a migration of the ions from the inlet to the outlet, the second controllable velocity is produced by a force that is neither radio frequency (RF) nor an alternating current (AC), and detecting the separated plurality of charged particles, wherein an internal portion of the drift tube is at atmospheric pressure.

BRIEF DESCRIPTION OF THE DRAWINGS

The above mentioned and other features and objects of this disclosure, and the manner of attaining them, will become more apparent and the disclosure itself will be better understood by reference to the following description of exemplary embodiments of the disclosure taken in conjunction with the accompanying drawings, wherein:

FIG. 3A illustrates the analytical 1D solution while

FIG. 4B illustrates how the intermittent push flow separates ions according to various embodiments;

FIG. 4C illustrates how a nearly stopping potential methods separates ions according to various embodiments;

FIG. 9A contains sample data from a conventional differential mobility analyzer (DMA) using intermittent push flow and FIG. 9B contains sample data from a DMA with an inverted drift tube;

FIG. 13 illustrates a table containing sample data according to various embodiments.

Figure 1:
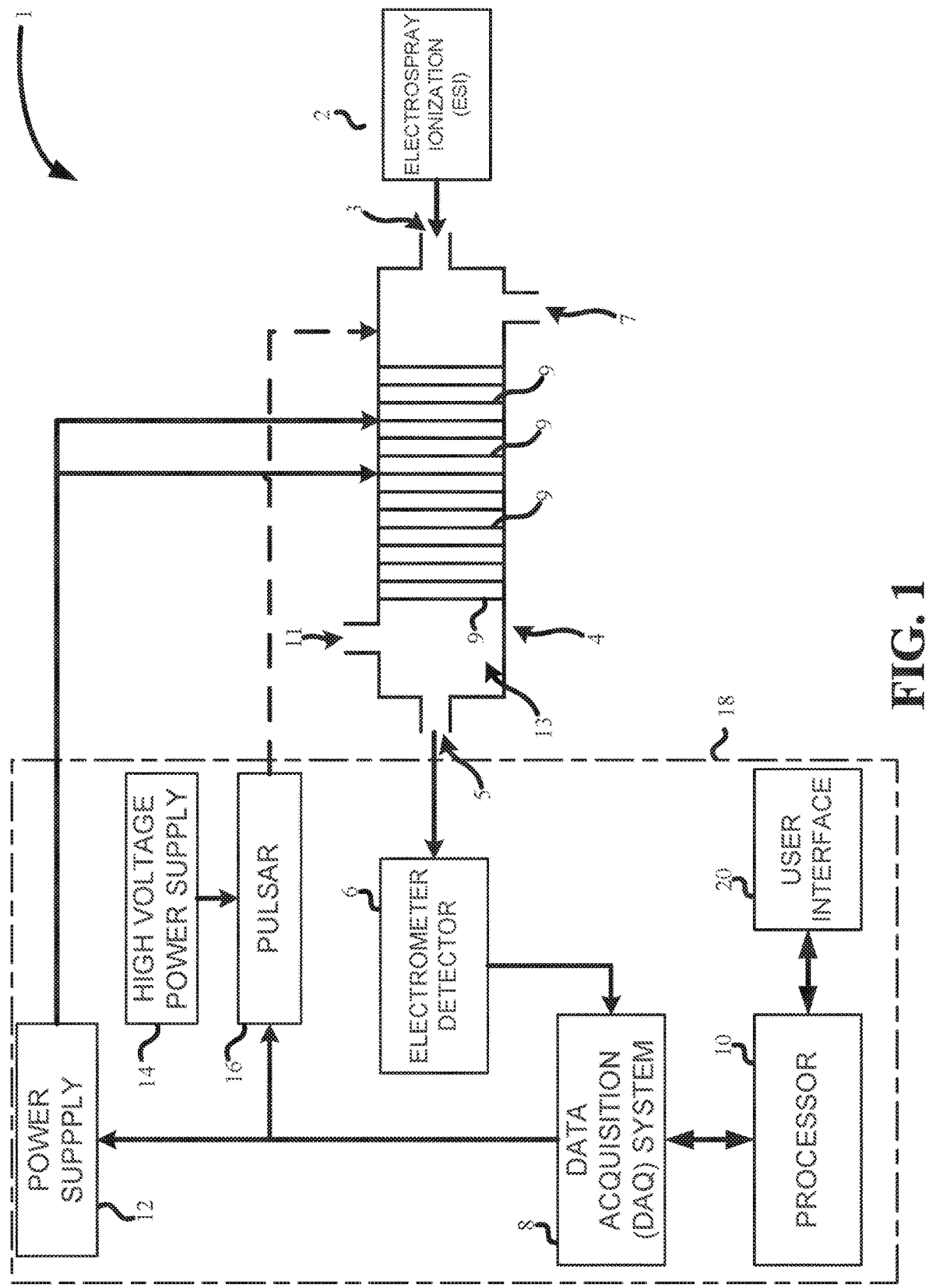
FIG. 1 illustrates an ion spectrometer according to various embodiments.

Corresponding reference characters indicate corresponding parts throughout the several views. Although the drawings represent embodiments of the present disclosure, the drawings are not necessarily to scale and certain features may be exaggerated in order to better illustrate and explain the present disclosure. The exemplification set out herein illustrates exemplary embodiments of the disclosure, in various forms, and such exemplifications are not to be construed as limiting the scope of the disclosure in any manner.

DETAILED DESCRIPTION

The embodiments disclosed below are not intended to be exhaustive or limit the disclosure to the precise form disclosed in the following detailed description. Rather, the embodiments are chosen and described so that others skilled in the art may utilize its teachings.

As used herein, the modifier "about" used in connection with a quantity is inclusive of the stated value and has the meaning dictated by the context (for example, it includes at least the degree of error associated with the measurement of the particular quantity). When used in the context of a range, the modifier "about" should also be considered as disclosing the range defined by the absolute values of the two endpoints. For example, the range "from about 2 to about 4" also discloses the range "from 2 to 4."

As briefly described above, charged gas phase nanoparticles can be subject to drift and separation by means of electric fields. The charge divided by the friction coefficient of the nanoparticle under such fields is defined as electrical mobility and its accurate reckoning is key to the determination of particle size distribution functions. In Aerosol Science, and when dealing with globular particles, a particle's electrical mobility is linked to its diameter, $d_p$, through the well-known equation:

$$Z = \frac{qeC_C(K_n\lambda, d_p)}{3\pi\mu d_p} \qquad \text{Equation (1)}$$

where qe is the net charge on the particle (the product of the integer charge state and the unit electron charge), $\mu$ is the dynamic viscosity and $\lambda$ is the mean free path. $C_c$ is the Cunningham's correction factor and is a function of the Knudsen number. Most often, mobility based size distribution functions are measured with differential mobility analyzers (DMA) coupled to Condensation Nucleus Counters CNCs, and operated in series as a scanning mobility particle sizer (SMPS).

While the SMPS combination has been incredibly successful, there are several shortcomings to its use which could be improved upon employing different techniques. Because the residence time—length divided by sheath velocity—of transmitted particles in a DMA is fixed and independent of particle size, diffusional broadening leads to degradation of instrument resolution for sub 20 nm particles.

For particles larger than 20 nm, the resolution, defined as Z/ΔZ, is typically fixed and with values of approximately <10 for most operating commercial devices. This may result in adequate resolution but sometimes insufficient. For example, in conventional systems a 90 nm monodisperse distribution is often barely distinguishable from a 100 nm monodisperse distribution assuming a resolution of 6.

Similarly, conventional SMPSs typically require several minutes to complete voltage scans, and even in faster scanning instruments, particles of different sizes are sampled at different times. This limits information that can be obtained when aerosols are varying rapidly, such as can occur during sampling with an aircraft, near roadways, or from a combustion engine.

Further, conventional DMAs often require the use of high sheath flow rates, and as such, require modest to high flowrate pumps which may remain stable during operation. This, along with the need of a scanning high voltage source, leads to increase costs in DMA operation.

For mobility spectrometers at atmospheric pressure that deal with nanoparticles between 1-120 nm, there is therefore the need to 1) increase resolution by correcting diffusion broadening of nanoparticles in the drift cell, 2) increase the maximum fixed resolution or make the resolution directly proportional to particle size (or inverse mobility) and 3) obtain complete unsteady profiles of particles on rapidly varying aerosols.

Problems 2 and 3 have been addressed somewhat by the use of Drift Tube Ion Mobility Spectrometers (DT-IMS). In such systems, particles of all mobilities are sampled as a packet at a specific time and are guided by a constant electric field to the detector providing separation that depends on the length and electric field. Particles are however still affected by diffusion broadening and, for a fixed electric field and length, yield fixed resolutions independent of size.

To achieve high resolution (>100), the conventional instrument lengths must be on the order of meters or make use of fairly high electric fields, precluding its use as a portable instrument to measure 20-100 nm particles. The need to improve the Ion Mobility systems is quite apparent as multiple improvement designs are becoming available in the last years such as the radial opposed migration ion and aerosol classifier (ROMIAC) or the drift tube ion mobility spectrometer (DTIMS) at room pressure or the structures for lossless ion manipulations (SLIM) or Trapped Ion Mobility (TIMS) instruments at low pressures.

Here a new atmospheric pressure instrument is disclosed that, in some embodiments, uses at least two varying controllable opposite forces to correct for diffusion broadening while having its resolution be dependent on mobility, and which increases with the size of the particle. As used herein, the term atmospheric pressure or room pressure are used synonymously and are used in the broad sense in that the pressure in the drift tube is substantially similar to the pressure outside the drift tube, such as the pressure of the area surrounding the ion mobility spectrometer. Thus, for example, atmospheric pressure may be understood to include operation at high altitudes or in laboratory rooms with positive pressure (e.g., that maintain positive pressure for safety reasons, such as OSHA regulations). Such pressures may include pressures from about 0.6 atm to about 1.4 atm, from about 0.8 atm to about 1.3 atm, or from about 0.9 atm to about 1.1 atm, or any combination thereof.

FIG. 1 illustrates an ion mobility spectrometer according to various embodiments. Ion mobility spectrometer 1 may include an electrospray ionization (ESI) source which may produce the ions from a sample. The ions may then enter drift tube 4 at inlet 3 and may be carried by a gas entering at gas inlet 7, such as a buffer gas. The ions may then pass through a series of mesh screens 9 until the ions exit the drift tube through outlet 5 where they are detected by electrometer 6. The gas may exit the drift tube through gas outlet 11. The electrometer 6 may form part of control block 18, which may include a data acquisition (DAQ) system in electrical communication with processor 10, user interface 20, and electrometer detector 6. Power supply 12 may supply power to various components of drift tube 12, such as resistors shown in FIG. 2, which may be in contact with mesh screen 9 to provide an electrical field (e.g., an electromagnetic field). High power supply may supply power to pulsar 16, which may be in communication with drift tube 4.

Thus, as can be seen in FIG. 1, drift tube 4 may include an inlet 3 configured to receive ions, and an outlet 5. Moreover, drift tube 4 an internal portion 13 having a pressure that is about atmospheric pressure and is configured to separate ions using a convective velocity from a carrier gas that transports the ions from the inlet 3 to the outlet 5, and a second controllable velocity that alters a migration of the ions from the drift tube inlet to the drift tube outlet, and neither radio frequency (RF) nor an alternating current (AC) center the ions.

Figure 11:
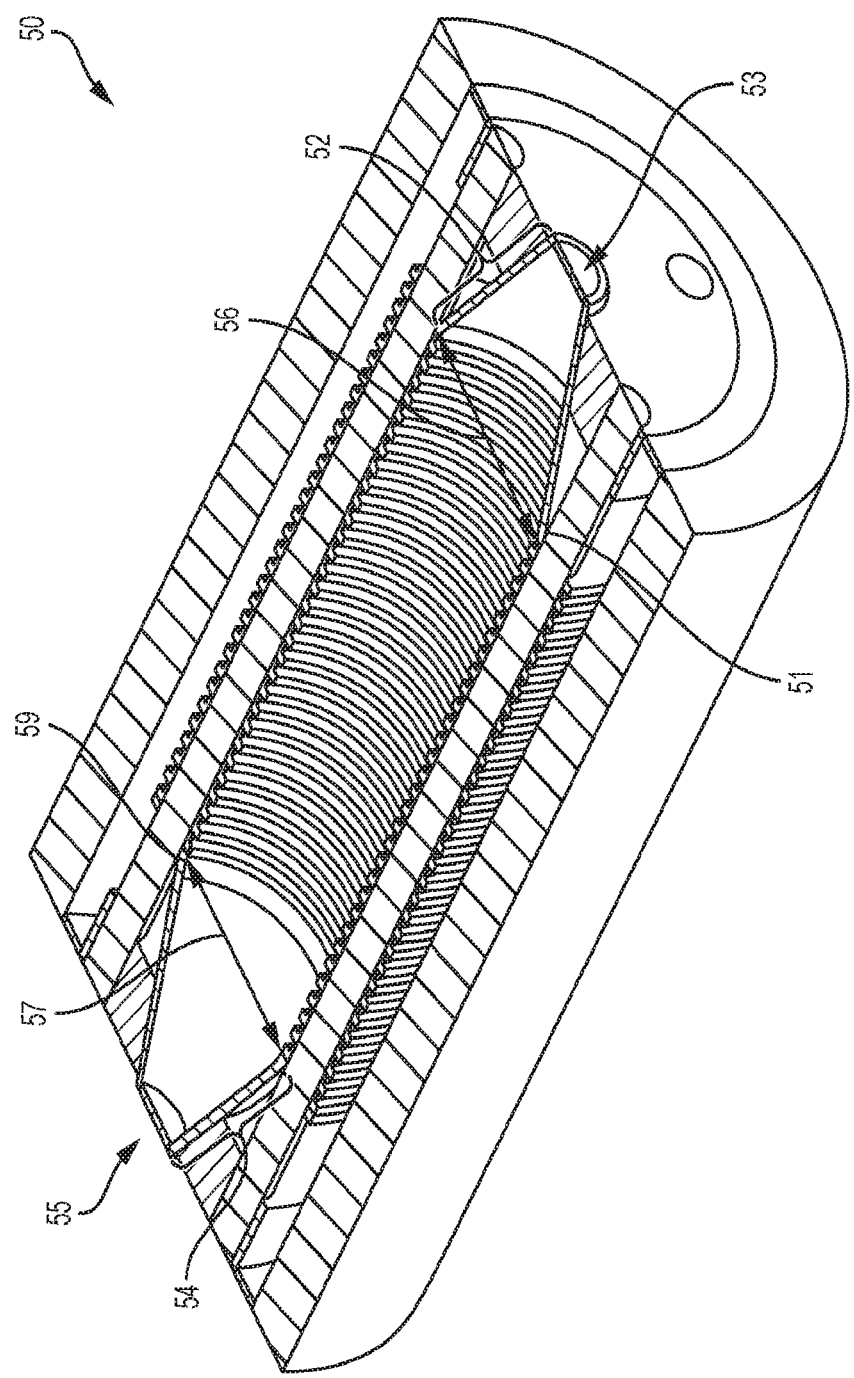
FIG. 11 illustrates a tapered drift tube according to various embodiments.

The materials for drift tube 4 are not particularly limited and may include any conventional materials or mixture of materials suitable for ion mobility spectrometer drift tubes. Moreover, the shape of the drift tube 4 is not particularly limited and, in some embodiments, may be tapered. For example, FIG. 11 illustrates a tapered drift tube 50 according to various embodiments. Tapered drift tube 50 may have an inlet 53 and a first distal point 51 that has a larger internal diameter 56 than the inlet 53. In some embodiments, a first distal internal portion 52 may be tapered or in other words, the internal diameter 56 increases from the inlet 53 to the first distal point 51.

Similarly, in some embodiments, the outlet portion of drift tube 50 may have a tapered portion 54. Thus, second distal point 59 that is between outlet 55 and inlet 53 may have an internal diameter 57 that is larger than the diameter of outlet 55.

In various embodiments, the force that produces the second controllable velocity may be a gravitational force, a centripetal force, a centrifugal force, an electric field force, or a combination thereof. For example, in various embodiments an electric field force (e.g., an electromagnetic field) may be used to produce the second controllable velocity.

Figure 12:
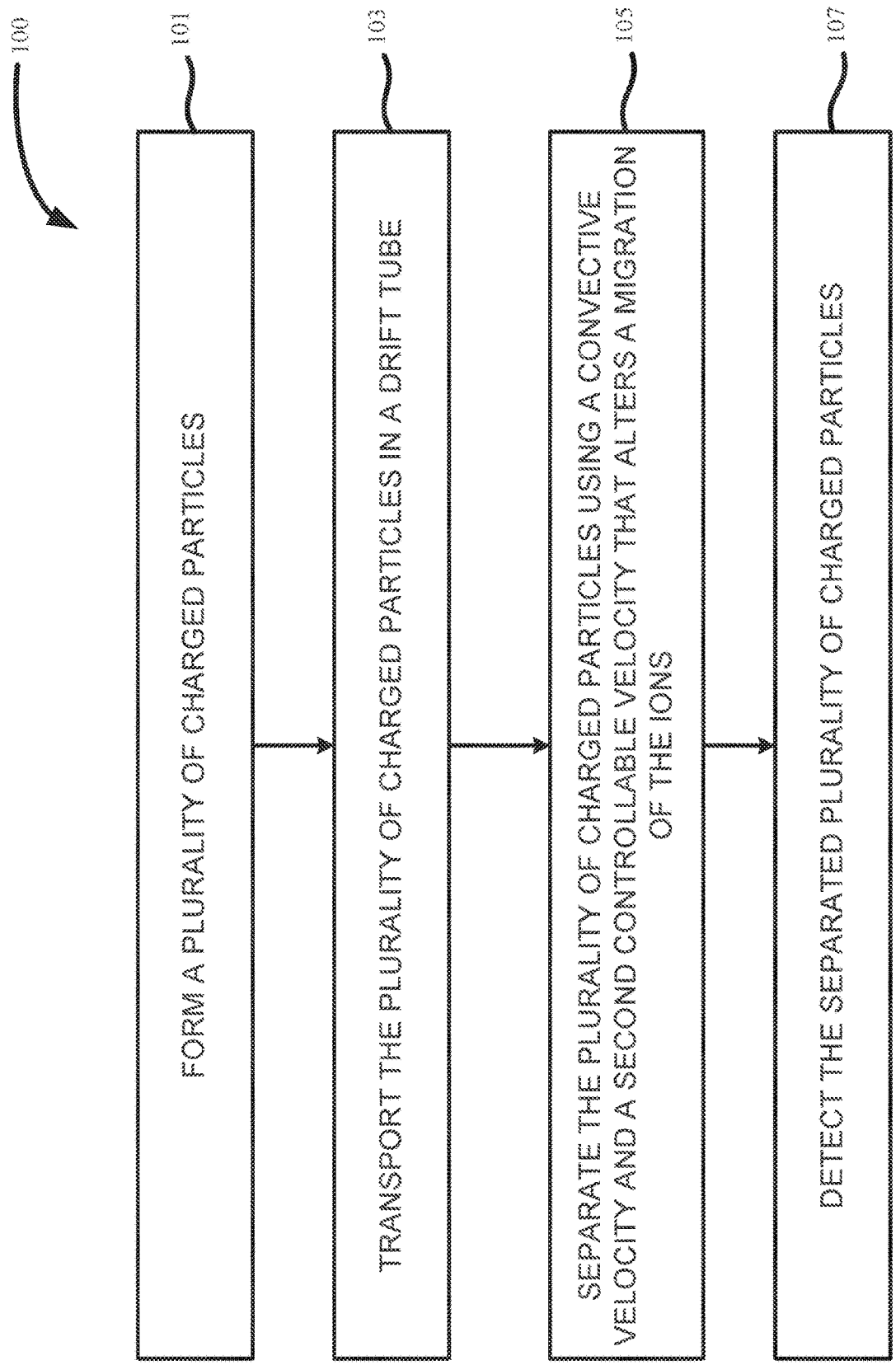
FIG. 12 illustrates a method of separating charged particles according to various embodiments.

Such ion mobility spectrometers may be able to perform the various methods disclosed herein for classifying ions or charged particles. For example, FIG. 12 illustrates a flow diagram of a method of classifying charged particles according to various embodiments. Method of classifying charged particles 100 may include forming a plurality of charged particles (step 101), transporting the plurality of charged particles in a drift tube (step 103), and separating the plurality of charged particles using a convective velocity and a second controllable velocity that alters a migration of the ions from the drift tube inlet 3 to the drift tube outlet 5 and does not center the ions with either radio frequency (RF) or with an alternating current (AC) (step 105). Finally, method 100 may also include detecting the separated plurality of charged particles (step 107), where an internal portion of the drift tube is at a pressure that is at about at atmospheric pressure.

As previously described above, in various embodiments, the force that produces the second controllable velocity may be a gravitational force, a centripetal force, a centrifugal force, an electric field force, or any combination thereof. The force that produces the second controllable velocity is not particularly limited and in some embodiments, may alter a velocity of the ions traveling from the inlet to the outlet without stopping the transportation of the ions from the inlet to the outlet.

Figure 5:
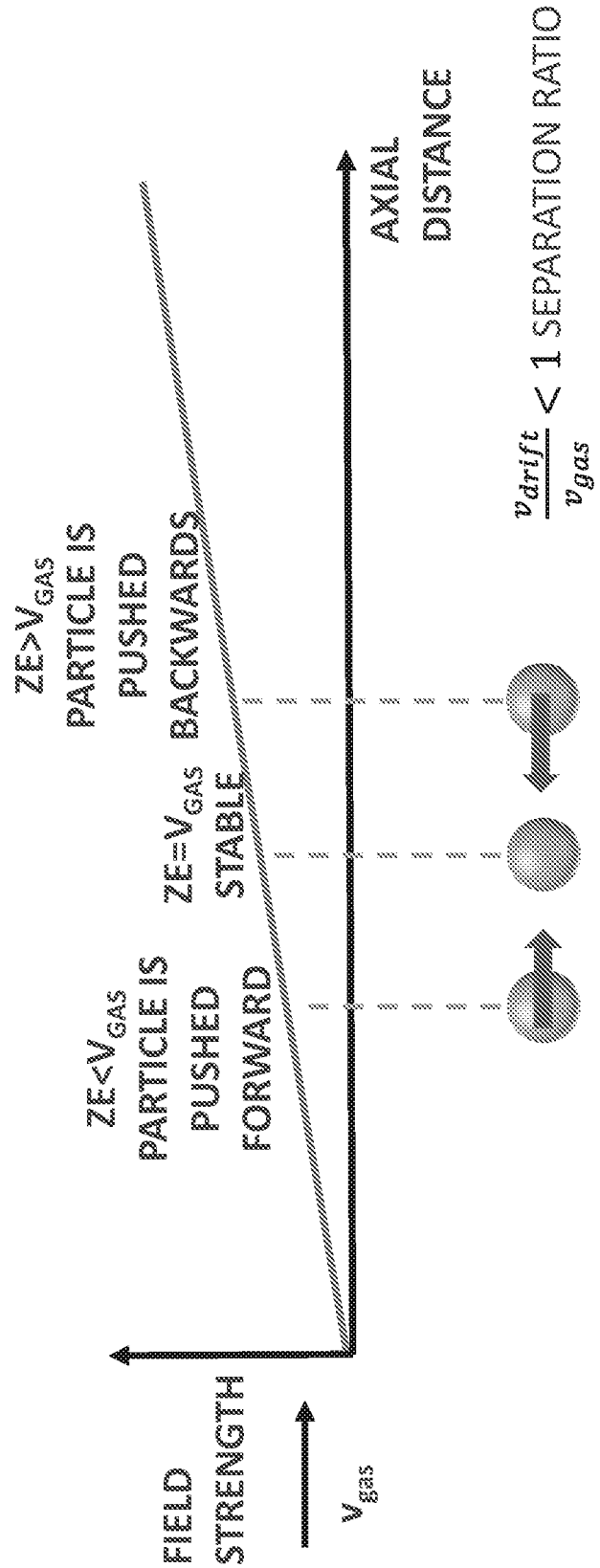
FIG. 5 illustrates the diffusion auto-correction according to various embodiments.

Moreover, in some embodiments, such as when the force is an electric field force, the force that produces the second controllable velocity may also control the ions diffusion in an axial direction of the drift tube. This may also be understood to be a diffusion auto-correction, which may help to correct the radial diffusion of ions or charged particles as the travel through the drift tube, as shown in FIG. 5.

Also in come embodiments, the force that produces the second controllable velocity may increase from the inlet 3 to the outlet 5. For example, in some embodiments, the force that produces the second controllable velocity may increase linearly. As described in greater detail below, such methods and drift tubes may allow for charges particles having sizes greater than 50 nm, greater than 100 nm, or greater than 200 nm to be detected with sufficient resolution.

Figure 2:
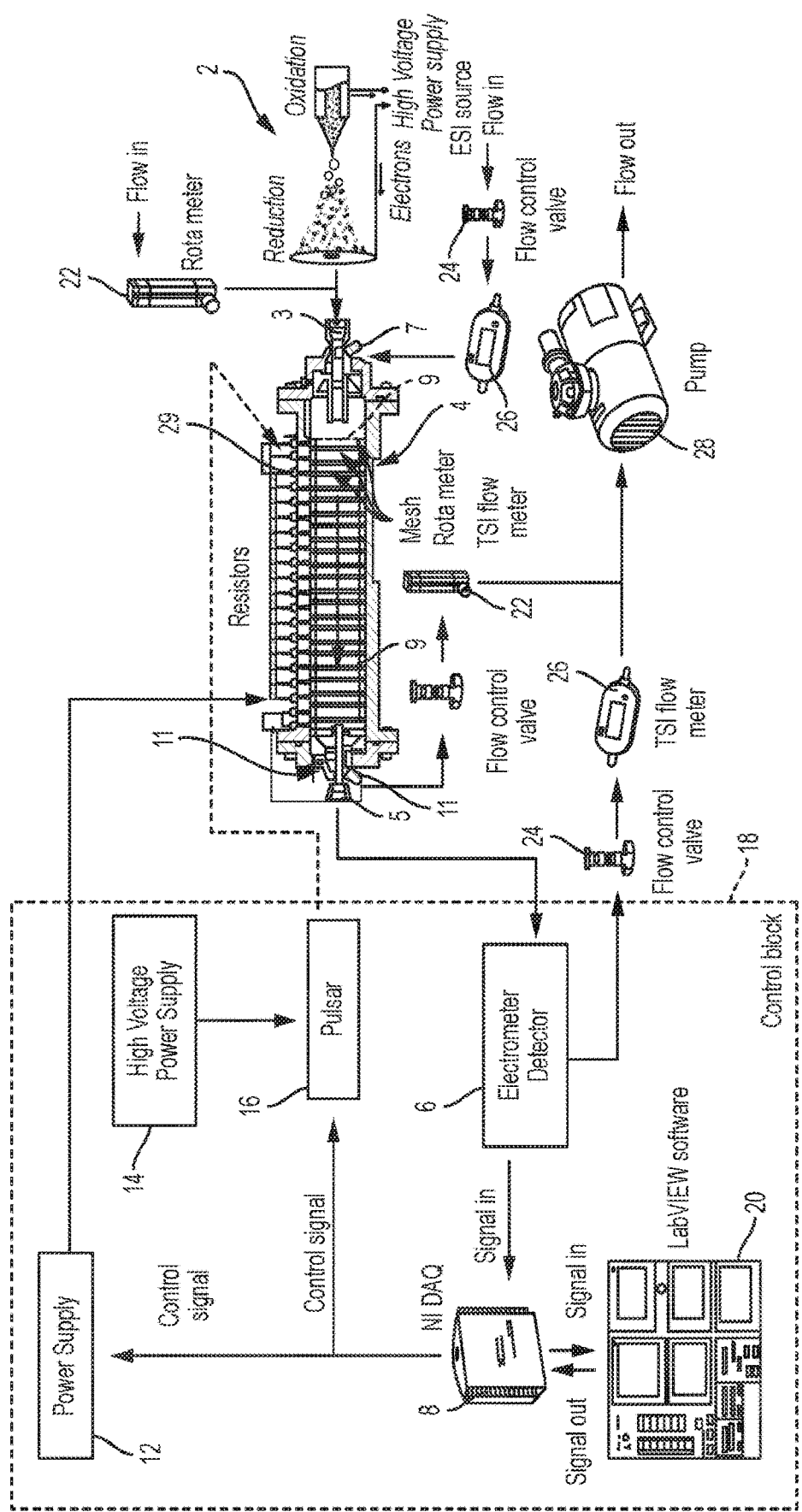
FIG. 2 illustrates an ion spectrometer using an electric field according to various embodiments.

FIG. 2 illustrates an exemplary ion mobility spectrometer with a drift tube 4 that uses an electric field force according to various embodiments. Many aspects of FIG. 2 are similar or identical to those of FIG. 1, which was previously described. FIG. 2 illustrates ion mobility spectrometer that uses an electric force to produce the second controllable velocity, such as s second controllable velocity that increases from the inlet to the outlet. In various embodiments, the convective velocity may be different than a drift velocity of the ion. For example, in some embodiments, the second controllable velocity may control the ions' diffusion in an axial direction (e.g., auto-correction), may control the ions' diffusion in a direction that is opposite from the convective velocity of the carrier gas, or both.

As can be seen in FIG. 2, the ESI source 2 may form ions (e.g., with electricity), which may then enter inlet 3 of drift tube 4. Flow valves 24 may be used in conjunction with rotameters 22, TSI flow meters 26, and gas pump 28 to supply and control the flow of gas through drift tube 4. Mesh screens 9 may be electrically connected to power supply 12 via resistors 29, which may help to form an electric field force. As the ions flow through drift tube 4, they are separated and may exit through gas outlet 11 or may exit through outlet 5, where they are detected by electrometer detector 6 and analyzed by DAQ 8. The results may then be displayed on user interface 20, which may include spectra data, such as that found in LabVIEW®, a registered mark of the National Instruments Corporation, a Delaware corporation.

This disclosure provides for drift tubes, ion mobility spectrometers, and methods that are able to increase the resolution of above the existing instruments for a broad range of sizes (<1 nm-120 nm in diameter) while maintaining sensitivity (comparable to 20 cm drift tubes). One non-diffusional transfer function of a DMA is a well-known function of the ratios of the flow rates. In terms of resolution, one can write:

$$R_{DMA} = \frac{Q_{sh} + Q_e}{Q_a + Q_s} \qquad \text{Equation (2a)}$$

where $Q_{sh}$ is the incoming sheath flow rate, $Q_e$ is the excess output flow rate, $Q_a$ is the aerosol inlet flow rate, and $Q_s$ is the aerosol outlet flow rate. Although not appearing in eq. (2a) the DMA resolution may be strongly affected by the diffusion broadening effect. The diffusional variance may be in inverse proportion to the voltage diff 4 kT/qV 2 23 which will greatly affect higher mobility particles (smaller diameter particles) since the voltage needed to filter them through the DMA is smaller yielding lower values of resolution for highly mobile particles.

Given that DT-IMS separation occurs in time—by allowing the ions to travel a given length, its resolution, x/x, is given by:

$$R_{DT-IMS} = \frac{x}{\Delta x} = \frac{tv_{drift}}{(16D_L t \ln 2)^{1/2}} = \left(\frac{qEL}{16kT\ln 2}\right)^{\frac{1}{2}}, \qquad \text{Equation (2b)}$$

where q is the charge, E is the electric field, L is the tube length, $D_L$ is the longitudinal diffusion coefficient and T is the temperature. The resolution may increase with the electric field and the length as the ½ power, but the broadening of the peak Δx may be affected by $D_L t$ which increases with time. The DT-IMS has resolutions that are normally close to 100 for 2 meter instruments but they suffer from diffusion broadening and are not mobility dependent like conventional systems. Large electric fields could be used in various embodiments to obtain higher resolutions and smaller instruments.

However, for portable instruments (~10 cm) and particles of fairly low mobilities (K>1e$^{-8}$ m$^2$/Vs), electric fields (40 kV/m) to have resolutions >100 may yield acquisition times of 250 s that most likely would lead to the loss of the nanoparticles prior to reaching a detector.

Accordingly, there is a need to overcome, stop or delay the diffusion broadening effect that affects both DMAs and Drift Tubes while having a resolution that scales with inverse mobility. Systems and methods disclosed herein can be understood to try and mimic the advancing of the ion through a drift tube without the need to cover any length by providing a second force that restricts the advancing of the ions while maintaining mobility separation—hence gaining the drift tube advantage of length dependent resolution without the need of long tubes. In the IDT, one can make use of the electric field as an opposing mechanism to the advancement of the ions through the cell. This still allows for separation in time but where the mobility separation is no longer only subject to a direct square root dependence of the length and field.

Figure 4A:
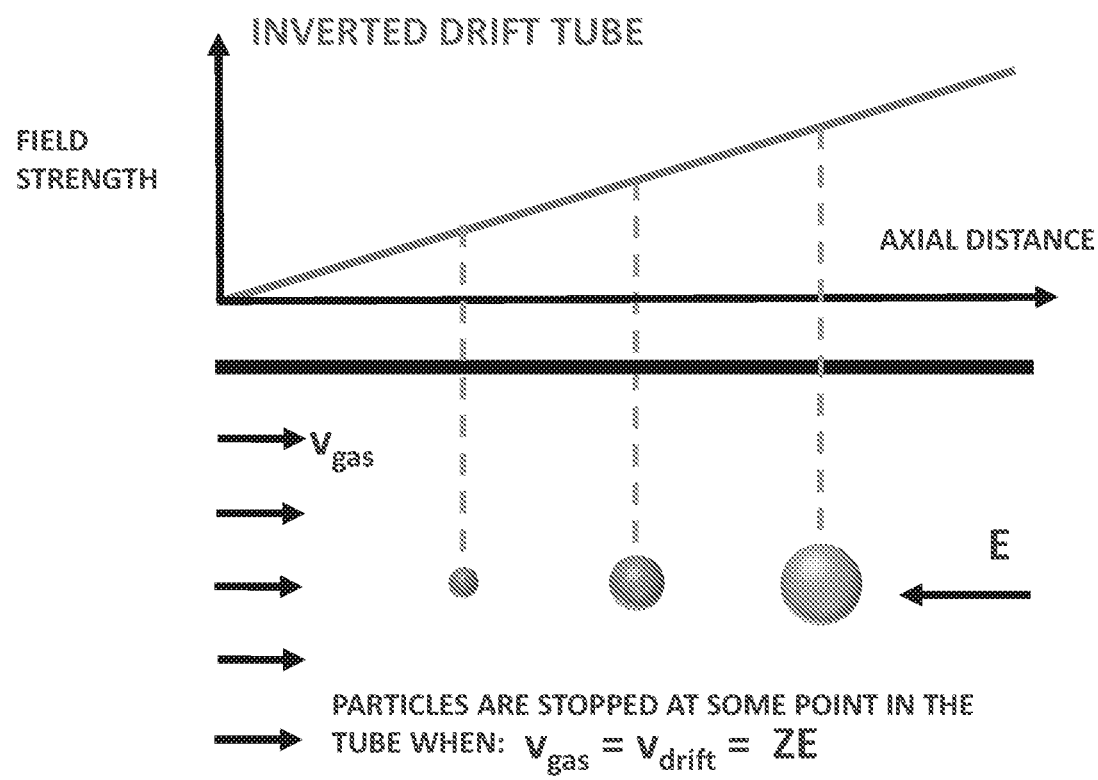
FIG. 4A illustrates how the inverted drift tube (IDT) separates different ions or charged particles.

FIG. 4A shows an exemplary IDT according to various embodiments. The instrument consists of a 120 mm long tube and 48 mm diameter making the system a compact drift cell when compared to regular Drift Tubes. The separation mechanism is as follows. At room pressure, packages of ions of multiple mobilities, inserted at the entrance of the tube at time $t_0$ using a pulsed Bradbury-Nielsen gate, are pushed by a gas flowing with a velocity $v_{gas}$ downstream. A series of electrodes are equally spaced inside the drift tube and are connected through resistors into a power supply. The electrodes are used to create a linearly increasing electric field which opposes the gas flow of the ions slowing their movement relative to $v_{gas}$ (~0.04 m/s unless otherwise specified). This allows the ions to be separated depending on their mobility through the drift velocity $v_{drift}$=KE. Given that the field opposes the flow, the lowest mobility ions are the ones ahead in contrast to a regular DT-IMS, hence the term "Inverted". As long as the ratio $$\frac{v_{drift}}{v_{gas}},$$

termed from here on separation ratio, Λ, is smaller than unity, the ions of a given mobility will traverse through the drift cell without being completely stopped. Eventually, these ions can be collected downstream of the drift tube. The closer $$\Lambda = \frac{v_{drift}}{v_{gas}},$$

is to 1, the longer time the ion remains in the drift cell and the higher the separation may be. However, if at some point inside the drift cell, the ratio Λ=1 is reached, particles of such mobility would be stopped and pushed towards the walls due to the residual radial electric field that arises from Laplace's equation where $\nabla^2 V$=0.

With a large range of ion sizes, some embodiments may allow all mobilities of interest to traverse the drift cell while trying to keep the ratio A as close to 1 as possible without losing the ions. As A is mobility dependent, not all mobility ranges being analyzed simultaneously may have high separation ratios. With that in mind, two different mechanisms are exemplified below to illustrate the separation of ions using the IDT:

(1) Intermittent Push Flow (IPF)

When trying to separate a wide range of mobilities, a need to vary the opposing electrical field may be used to acquire all mobilities at high resolutions. An exemplary embodiment of this method is depicted in FIG. 4B, where the highest possible field slope (dE/dx=A) for a given electrical supply is initially selected. Before the ion with the highest mobility hits a separation ratio of Λ=1, the slope of the electric field is lowered and thus ensuring that Λ=1 will never be reached. This drop in the slope can happen as many times as needed until all necessary ions are collected at the end of the drift tube. The resolution and separation of the peaks will depend on the range of mobilities.

(2) Nearly-Stopping Potential Separation (NSP):

When trying to separate ions of very close mobilities, alternative embodiments may include the use of an opposing "constant" electric field which is slightly below the necessary field to maintain the separation ratio slightly below 1 for all ions of interest hence maximizing the separation potential. This method is depicted in FIG. 4C.

The various embodiments and various mechanisms used may vary depending on the range of mobilities and the resolution desired. The advantage of these type of opposing-field instruments is their autocorrecting properties when used as Intermittent Push Flow separators. A derivation of the transport distributions for ions in the IDT with linearly increasing fields is analytically established focusing on its autocorrecting properties and instrument resolution is described in further detail below.

While different versions of instruments (such as Trapped Ion Mobility Spectrometers (TIMS)) use electric fields opposite to the flow and have been applied in recent years, the implementation has always been at low pressure and for very high mobilities, which allows the particles to be captured using an RF field when $$\frac{v_{drift}}{v_{gas}},$$

something that may be difficult to be pursued at room pressure. After $\Lambda=1$ has been reached in TIMS, the ions are then subsequently pushed by lowering the electric field to the critical value that pushes the particles through.

To simplify the examples herein, it was assumed that the IDT had a fixed increasingly linear electric field to study particles of only one mobility. Let a concentration of n(r, z, t) ions of charge q drift through a tube where a gas flows at a velocity $v_{gas}$ and where a linearly increasing electric field, $\vec{E}=Az\vec{k}$, is applied opposite to the flow (A is the slope of the field). In a case where the concentration of ions n(r,z, t) is low enough that space charge can be neglected, the balance equation for the species can be given by:

$$\frac{\partial n}{\partial t} - \nabla \cdot (\overline{D} \cdot \nabla n - (\vec{v}_{gas} - K\vec{E})n) = 0, \quad \text{Equation (3)}$$

with $\overline{D}$ being the diffusion tensor and K the electrical mobility. If one considers the one-dimensional problem neglecting radial electric field and diffusion, eq. (3) can be written in Cartesian coordinates as:

$$\frac{\partial n}{\partial t} - \nabla \cdot (\overline{D} \cdot \nabla n - (v_{gas} - K\vec{E})n) = 0, \quad \text{Equation (4a)}$$

being the initial concentration at time $t_0$ at the beginning of the tube the surface density:

$$n(0,0)=ns \quad \text{Equation (4b)}$$

The Sturm-Liouville solution to the equation for the aforementioned initial concentration can be written as:

$$n(z, t) = \frac{n_s}{\sqrt{2\pi\sigma^2}} e^{-\frac{(z-X)^2}{2\sigma^2}}; \text{ with} \quad \text{Equation (5a)}$$

$$\sigma^2 = \frac{2D_L}{\partial t}\left(x - \frac{KA}{2v_{gas}}x^2\right) =$$
$$\frac{D_L}{KA}(1-e^{-2KAt}) = \frac{kT}{qA}(1-e^{-2KAt}); \text{ and} \quad \text{Equation (5b)}$$

$$x = \frac{v_{gas}}{KA}(1-e^{-2KAt}). \quad \text{Equation (5c)}$$

There are several features that differentiate this equation from that of the regular conventional drift tube. Most importantly the standard deviation 6 as shown in equation (5b) has a correction term $$\frac{KA}{2v_{gas}}x^2.$$

This "auto-correction" term is quadratic with the mean position x of the distribution so that it increases with the traversing distance through the drift cell. While the conventional drift tube distribution broadens as a function of time, the inverted drift tube distribution broadening is damped and eventually stopped. The contribution of $$\frac{KA}{2v_{gas}}x^2$$

increases with time (or distance) and, as the ion advances through the drift cell, invariably leads to an asymptotic value of the standard deviation given by kT/qA and independent of t (see eq. 5b). This asymptotic value will be reached when the separation ratio $\Lambda$ becomes one. In such instance, the mean position of the distribution will be given by $$\frac{KA}{2v_{gas}}$$

and the ion will no longer advance in the axial direction.

The resolution for the IDT can be calculated from eq. (5) as:

$$R = \frac{x}{\Delta x} = \frac{x}{2\sqrt{2\ln(2)\frac{kT}{qA}(1-e^{-2KAt})}} \quad \text{Equation (6)}$$

If the drift cell has length L, the resolution at distance L can also be calculated as:

$$R|_L = \frac{L}{\sqrt{16\ln(2)\frac{KkT}{qv_{gas}}\left(L - \frac{KA}{2v_{gas}}L^2\right)}} =$$

$$\frac{\sqrt{qL}}{\sqrt{16\ln(2)\frac{KkT}{v_{gas}}\left(1 - \frac{KA}{2v_{gas}}L\right)}} = \frac{R_{DT-IMS}}{\sqrt{\Lambda\left(1-\frac{\Lambda L}{2z}\right)}} \quad \text{Equation (7)}$$

Various observations have been found regarding the resolution as a function of length and different mobilities for a fixed slope A and $\upsilon_{gas}$ (solid lines). Unlike the resolution of the exemplary drift tube depicted in eq. (2b), the resolution of the IDT has found to have a positive dependence on the mobility. The resolution of the instrument is very high in terms of eq. (7) for very modest lengths, but, given the large difference in mobilities (8-80 nm), the separation ratio may be very small for the smallest mobilities. In fact, to avoid losing ions of any type, the separation ratio Λ was set well below 1 for most of the length of the drift tube (it was only close to one for the 8 nm particles when it reaches 12 cm and it is 0.01 for the 80 nm particle at 12 cm). To improve the resolution and separation ratio, IPF separation and/or NSP separation may be used. For the intermittent push flow, there is a theoretical optimal resolution for which the separation ratio Λ is kept constant for a particular mobility. This could include continuous change of the field slope A to guarantee that at any given position of the ion Λ~constant. The third expression in eq. (7) is obtained by using eq. (2b) and the definition of the separation ratio. Resolution as given in eq. (7) is not particularly useful for this type of instrument as opposed to the DMA or DT-IMS. The reason is that if the field slope was Λ=0, or no electric field, the residence time in the drift tube will be minimal and there will be no separation between any mobilities. However, the resolution would depend on the competition between diffusion and $\upsilon_{gas}$ which could still be very high. The importance of eq. (7) relies on the fact that when the separation ratio Λ increases, the residence time inside the system increases, but the resolution also increases in contrast to what is expected with just diffusion.

Since the electric field is solenoidal when space charge is neglected, the radial electric field might be non-negligible off-axis. Given $\Delta \cdot \vec{E}=0$, one can calculate the radial field for constant axial field cross sections $$\left(\frac{\partial E_z}{\partial z} = -A\right)$$

and which is given by $E_r=A_r/L$. The trajectories of off-axis particles were found due to the effects of radial electric fields (no diffusion considered) for two particular cases: a) constant separation ratio Λ=0.5 (dashed lines) and b) constant slope A=2.5e5 and ion mobility $K=1 \cdot 10^{-6}$ m²/Vs (8 nm) (solid lines). For case a) the initial condition was set at z=2.4 cm as the slope A would be too high to maintain a constant separation ratio Λ for smaller values of z. Values that are off axis up to 1.1 cm still reach the end of the tube. In case b), the separation ratio Λ increased with the distance z progressively reducing the velocity of the moving ions ($\upsilon_m=\upsilon_{gas}-\upsilon_{drift}$) until the drift from the radial field becomes of the order of $\upsilon_m$ at a given radial position. If this occurs, the ion will inevitably be lost. In some embodiments, consideration may be given for resolution that might be space charge dependent, for example when a high charge concentration is present. However, for small concentrations of large singly charged nanoparticles, this effect is expected to be negligible.

Resolution Using Constant Opposed Field (Nearly-Stopping Potential Separation)

To avoid radial field effects, one can resort to NSP separation mode where the electric field is constant. For such a case, the resolution of a distribution of ions, $R_{NSP}$, of mobility K after passing through the cell is equivalent to that of a DT-IMS (eq. (2b)) but where the field opposes movement:

$$R_{NSP} = \frac{\bar{x}}{\Delta x} = \sqrt{\frac{qL\upsilon_m}{16kT\ln(2)K}} = \sqrt{\frac{qL\upsilon_{gas}(1-\Lambda)}{16kT\ln(2)K}} \quad \text{Equation (8)}$$

As can be seen above, in equation (8), the separation ratio opposes resolution. The reasoning is quite clear, the larger the separation ratio, the longer the total residence time in the drift tube and the higher the chance ions have to diffuse before covering a distance L. In one embodiment, the resolution for nearly stopping potentials for a given mobility $K=1 \cdot 10^{-7}$ m²/V$_s$ (25 nm) as a function of the separation ratio Λ was found. It was clear from Equations 7 and 8 that, in some embodiments, $R=\bar{x}/\Delta x$ was an ill-conditioned term to define ion separation for the IDT instrument since, as the separation ratio increases, mobility separation in time was more likely opposite to what the resolution predicts. Therefore, a different criterion to establish whether ions of different mobilities can be separated and how well was established.

Numerical Simulations 1D numerical solution of equation (2) were found where the position of the distribution of singly charged ions of a single mobility is given as function of time for a specific set of parameters, namely A, K, $\upsilon_{gas}$, $D_L$ and initial condition $n_s$. The advantage of using numerical methods is that one can easily use the initial condition to be a distribution ns of any kind at time t=0 and study its evolution. Using the 1D numerical solution, a couple of notable features were found. The first of them is that there exists a maximum value of x at which the distribution of ions reach an asymptotic behavior. This asymptotic behavior occurs, as stated previously, at $$x_{asympt} = \frac{\upsilon_{gas}}{KA}$$

given by the separation ratio reaching a value of 1. The second feature is that the standard deviation of the ions will also asymptotically tend to a value $\sigma_{asympt}=kT/qA$ regardless of the initial distribution.

Figure 3B:
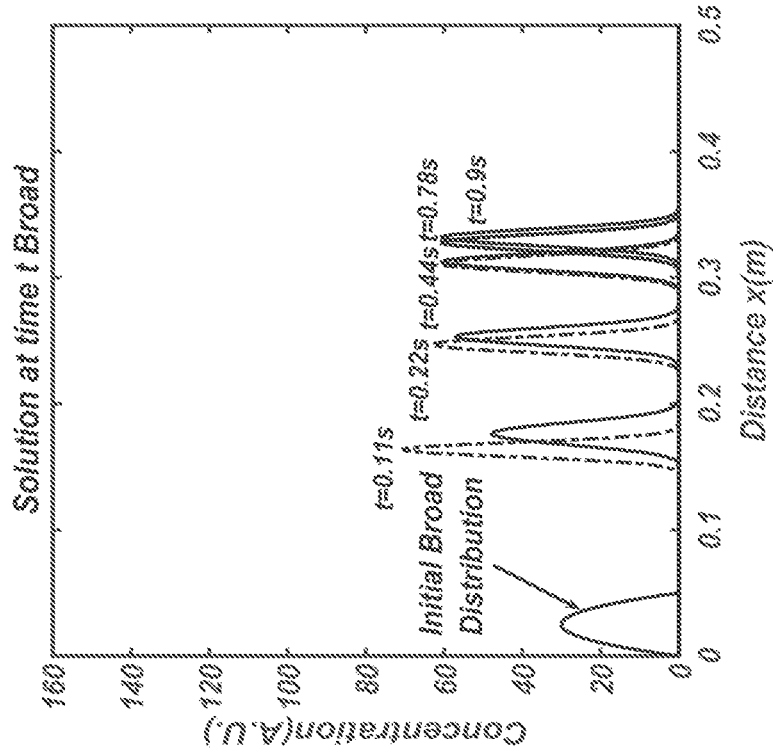
FIG. 3B illustrates the numerical 1D solution for two different initial distributions.
Figure 3A:
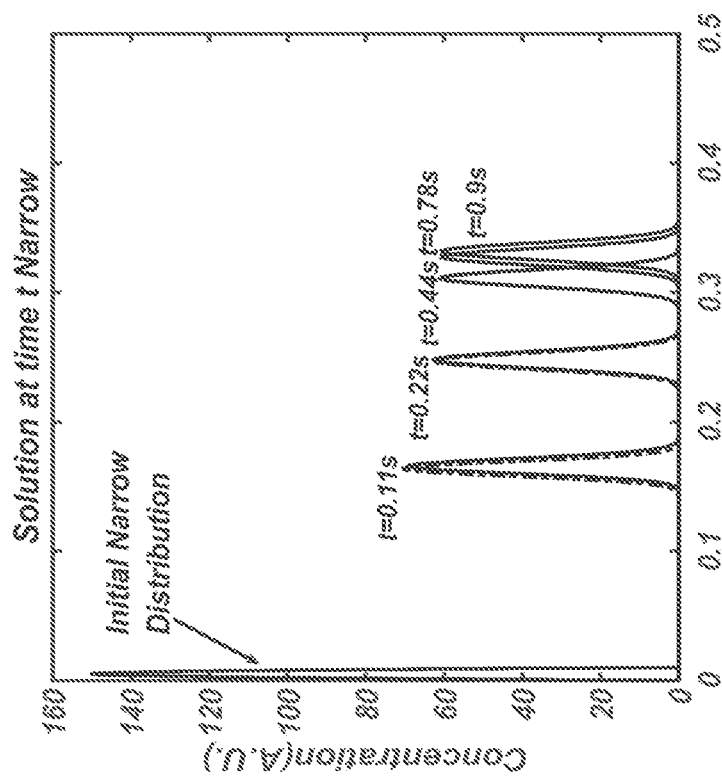

To test whether the asymptotic standard deviation was reached from different initial distributions, two initial distributions were modeled; one with smaller standard deviation than the asymptotic value ($\sigma_{initial}<\sigma_{asymp}$) and one with a larger one ($\sigma_{initial}>\sigma_{asympt}$). The distributions as a function of time are shown in FIGS. 3A and 3B and both are compared to the analytical solution—obtained using eq. (5a) giving excellent agreement between numerical (solid) and analytical (dashed). FIG. 3A clearly shows that when the initial distribution is very narrow, the distribution broadens and reaches the expected asymptotic behavior. The behavior follows the analytical solution quite accurately. When the initial distribution is broader than the expected asymptotic solution as in FIG. 3B, the distribution narrows in order to reach the expected asymptotic solution. This behavior is unique to the IDT instrument and provides the possibility of ultra-high resolution the ions were allowed to stay in the cell for a sufficient length/time. Without being limited to any theory, it is believed that this may be due to ions diffusing to the left of the equilibrium point have values of $\Lambda<\Lambda_{eq}$, and are pushed forward faster than those at $\Lambda_{eq}$. Similarly, for those ions diffusing to the right, $\Lambda > \Lambda_{eq}$, and they suffer a stronger electrical field which subsequently pushes them back to equilibrium.

3D Statistical Diffusion Simulation IDT Using SIMION for Ion Trajectories.

To fully test the validity of the exemplified IDT system for single particle trajectories in a full 3D environment, the commercial software SIMION was used. SIMION is an ion optics simulation software package that can model ion trajectories using three-dimensional electrostatic potential arrays. SDS (Statistical Diffusion Simulation) is SIMION's internal subroutine that simulates the motion of charged particles in electrostatic fields under atmospheric pressure. In SDS, ion motions are simulated using a combination of viscous drag forces and random ion jumping that depends on the number of collisions of ions with gas molecules simulating Brownian diffusion. In order to completely simulate gas flow field lines, a CFD simulation of the drift tube using Fluent was undertaken and the velocity profile tabulated and used in SIMION.

The existence of a radial field causes ions with separation ratios $\Lambda$ close to 1 to be pulled towards the electrodes and precluding the possibility of capturing the particles inside the drift tube. To avoid reaching separation ratios very close to 1 the two techniques mentioned in section 2 were developed and run in SIMION: Intermittent Push Flow (IPF) and Nearly-Stopping potential (NSP) separation.

Intermittent Push Flow Simulation

The one exemplary technique carried out was the IPF approach where the field slope was lowered at known fixed times so as to never reach a separation ratio of $\Lambda=1$. A SIMION simulation at 5 particular times was used to model spherical nanoparticles of 8 different sizes ranging from 20 to 120 nm as they travel through the inverted drift tube. The times coincided with those used to lower the values of the electric field slope. To optimize the pushes, the pushes were made right before the separation ratio $\Lambda$ becomes 1 for the highest mobility particle. Using this exemplary method, all particles were collected and easily separated in the span of 4.2 seconds. However, the largest particles—those with separation ratio much smaller than unity—did not achieve their maximum possible separation. In some embodiments, it may be possible, if desired, to resolve the largest particles, a higher separation ratio for such particles could be used, at the cost of losing higher mobility particles. For the this particular exemplary technique, 100 particles of each of the sizes studied were sampled and their time distributions collected. The resolution was subsequently calculated as $$\frac{t}{\Delta t}.$$

The resolutions obtained were in agreement with those obtained in analytical models and were extremely high compared to other instruments. Not a single particle was lost in the calculation process, so the transmission was 100%.

However, the simulation had the starting particles initially centered in the drift tube (deviation was always less than 0.5 cm) and space charge was neglected for the calculations. In any case, the loss of nanoparticles to the walls, even when space charge is considered, was not expected to be much higher than that of existing commercial instruments when the initial distribution is centered. Table 1 shown in FIG. 13 shows the mobilities and diameters of the particles used in the simulation as well as the electric field slope and the average positions of the ions when the pushes were made.

Nearly-Stopping Potential Separation Simulation

In some instances, the separation ratio was not near 1 and therefore the maximum expected resolution of the instrument was not achieved. To exemplify achievement of the maximum possible resolution of the instrument for a given $\upsilon_{gas}$–E pair, the NSP method was used where the field applied is constant throughout the drift tube with a value that makes the separation ratio $\Lambda$ close to 1 but slightly below for a nanoparticle of choice. In some instances, using a constant field eliminates the radial field component almost entirely and therefore separation ratios closer to 1 can be used without the risk of losing ions. In one particular test, singly charged nanoparticles of 55.89 and 55.93 nm in diameter were separated (a 0.07% difference in diameter) using this method. All nanoparticles with smaller diameters than 55.89 nm had separation ratios larger than 1 and were stopped at the entrance of the tube.

All nanoparticles that are much larger than 55.89 were collected on the detector. It was found that although initially both particles were indistinguishable, as they traveled through the drift tube, eventually the 55.89 nm particle was contained inside the drift tube for a longer period of time and effectively separated from that of 55.93 nm. Even though the resolution given by eq. (8) decreases with $\Lambda$, the ability to separate ions in time to occur in a regular DTIMS is in the thousands, something unimaginable with other systems. Such separation potential has many applications in the aerosol and biochemistry fields. As an example, it could separate virus capsids of very similar sizes atomized in the air. To adequately describe the separation in terms of mobility and residence time, a new parameter, the resolving power, is defined below.

Resolving Power Vs. Resolution

Figure 6:
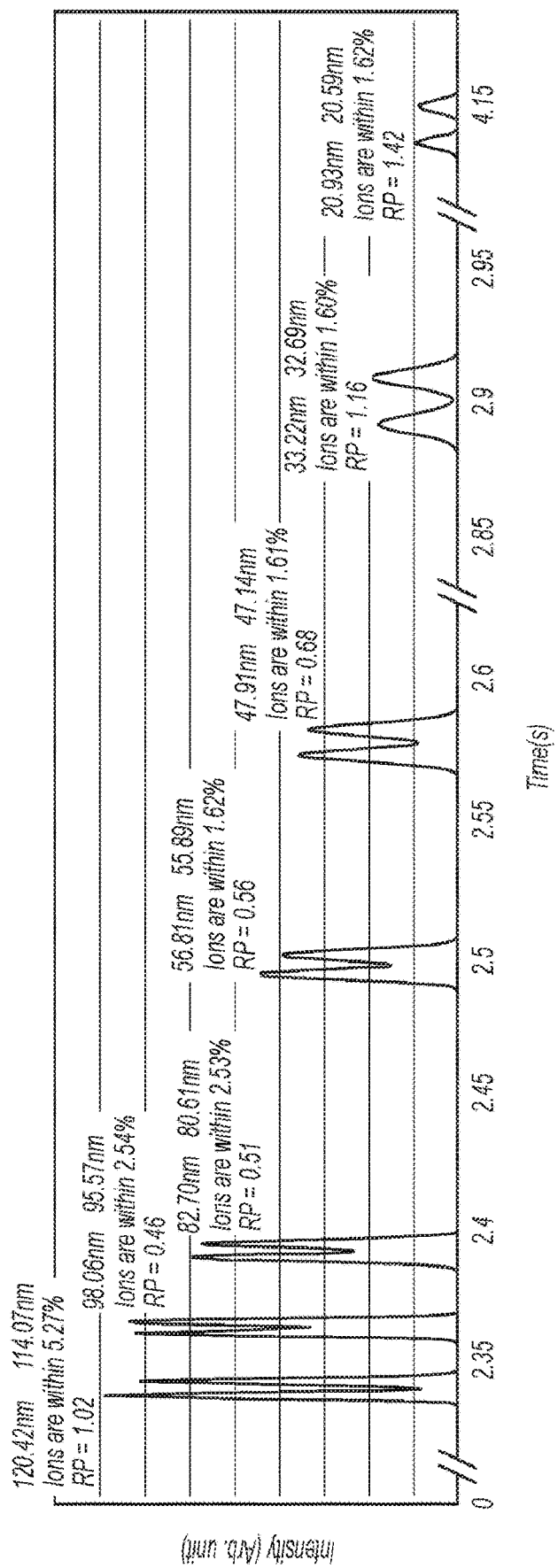
FIG. 6 contains sample data showing the resolution data for ion particles having masses from about 20 nm to greater than 100 nm.

To test whether or not the resolution provided by the IDT was sufficient to separate similar mobility particles using the intermittent push flow for a large range of sizes, e.g., 20 nm to 120 nm. Using SIMION of the distributions were acquired when pairs of particles of very similar mobilities are separated inside the IDT for the same particular pushes given in Table 1 of FIG. 13. As can be observed, mobility separation was not directly related to resolution since ions of 20.59 nm and 20.93 and low resolution were at least as well separated, if not more, than the high resolution 114.07 nm and 120.42 nm ions. In order to describe whether separation was possible, as a function of residence time inside the drift cell, another option was used instead. The other option used was the resolving power employed in chromatography, $$R_p = \frac{g_{HW}}{W},$$

given by the ratio of the gap between two peaks at the average half maximum, $g_{HW}$, divided by the average width, W, of the peaks. From its definition, a person of ordinary skill having the benefit of this disclosure could expect two peaks to be resolved if $R_p > 0.1$. The $R_p$ values for the simulation are also shown in FIG. 6. As can be seen in FIG. 6, although the resolution for the initial peaks (particle diameter of 120.42 nm and 114.47 nm) was in the thousands, the fact that the separation ratio $\Lambda$ for such ions was far from unity, provides only a resolving power $R_p=1.02$ (enough to differentiate the peaks) even though the particle diameters differ by 6 nm. On the other hand, the last pair of peaks (20.59 nm and 20.93 nm), which have Λ closest to unity, have a $R_p=1.42$ despite them being only 0.34 nm apart and while having resolutions of less than two hundred. It was clear that the time of residence inside the drift cell is key to separation. One can use the analytical resolution provided in equations 7 and 8 as a means to provide an analytical value of the resolving power. In such sense, $R_p$ can be also defined the time difference between the arrival of the center of the distribution of two similar ions divided by the average FWHM of the two peaks minus one $$\left(R_p = \frac{t_{diff}}{FWHM} - 1\right).$$

In particular, for IPF flow, and assuming a constant separation ratio through the drift cell, the resolving power is given by:

$$R_p = \frac{t_1 - t_2}{1/2(FWHM_1 + FWHM_2)} - 1 = \qquad \text{Equation (9)}$$

$$\frac{\sqrt{qL\upsilon_{gas}}\left(\frac{1}{\upsilon_{m1}} - \frac{1}{\upsilon_{m2}}\right)}{\frac{1}{2}\sqrt{16kT\ln(2)\left(\frac{\sqrt{K_1}}{\upsilon_{m1}^{3/2}} + \frac{\sqrt{K_2}}{\upsilon_{m2}^{3/2}}\right)}} - 1$$

Similarly, for the Nearly-Stopping Potential separation:

$$R_{p(NSP)} = \frac{\sqrt{qL}\left(\frac{1}{\upsilon_{m1}} - \frac{1}{\upsilon_{m2}}\right)}{\frac{1}{2}\sqrt{16kT\ln(2)\left(\frac{\sqrt{K_1}}{\upsilon_{m1}^{3/2}} + \frac{\sqrt{K_2}}{\upsilon_{m2}^{3/2}}\right)}} - 1 \qquad \text{Equation (10)}$$

Figure 7:
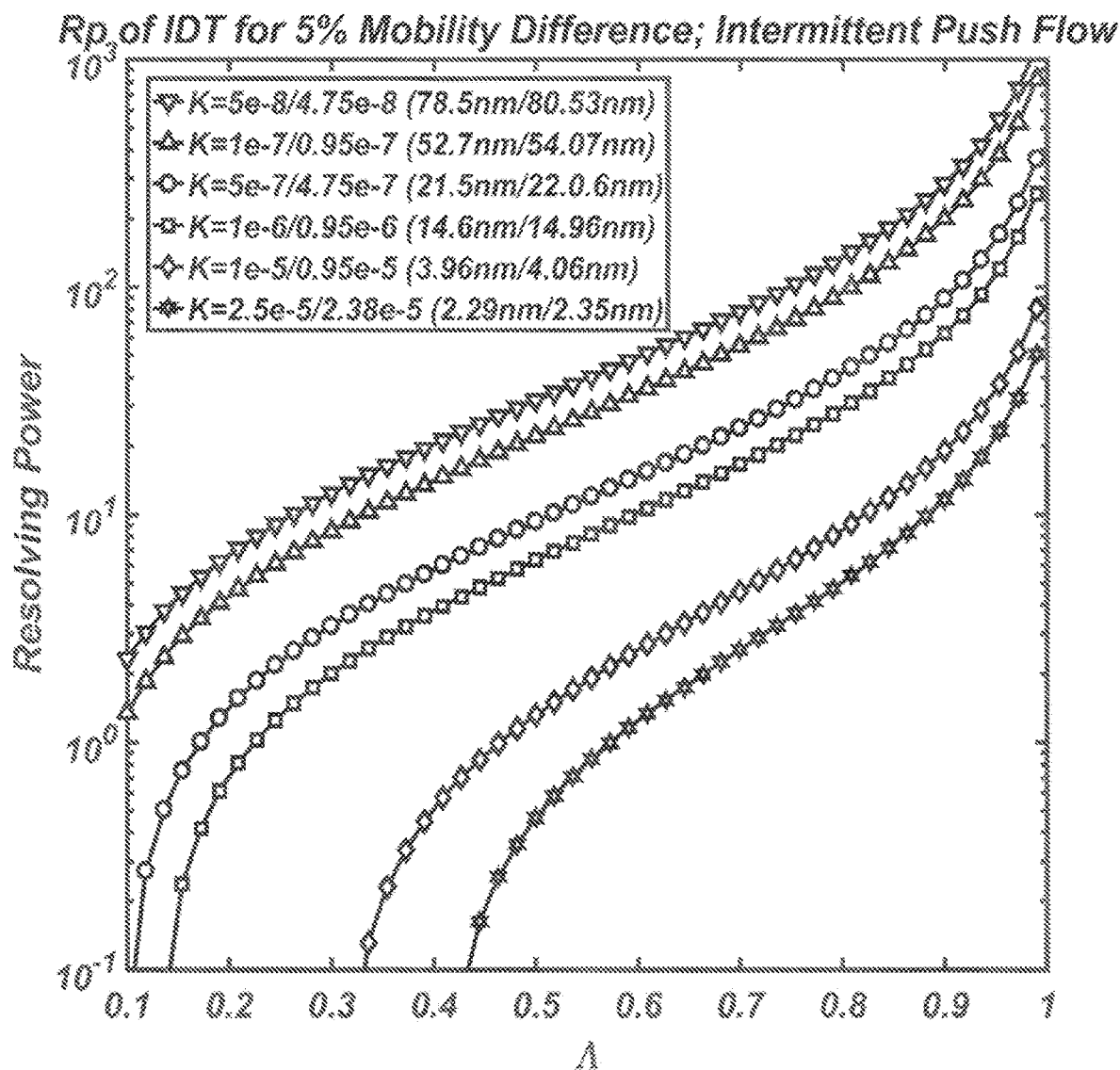
FIG. 7 contains sample data showing resolving power for intermittent push flow (IPF) separation as a function of ratio.
Figure 8:
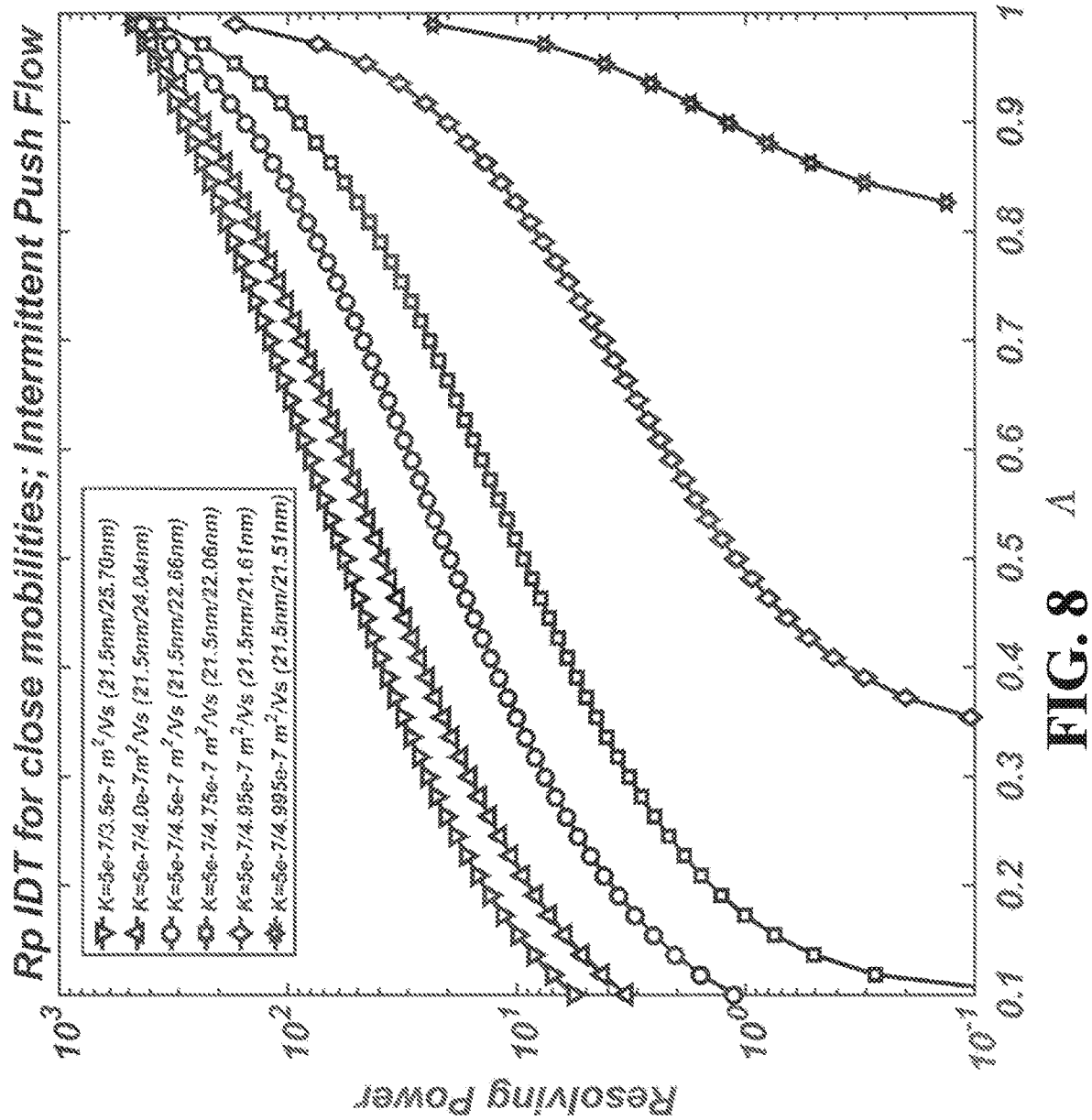
FIG. 8 contains sample data showing resolving power for nearly-stopping potential (NSP) separation as a function of ratio.

FIGS. 7-8 show the resolving power as a function of the separation ratio Λ for two different scenarios. FIG. 8 shows the resolving power when trying to separate mobilities that differ 5% (2.23% in diameter) using the Intermittent Push Flow. The graphs were cut purposefully at $R_p=0.1$ so that anything visible could be resolved at the appropriate separation ratio. In this particular embodiment, lower mobilities were readily separable for any separation ratio, while higher mobilities used higher separation ratios. For example, to separate two ions that differ in diameter 0.06 nm at 2.29 nm used at least a constant separation ratio of 0.43 or higher. To more fully demonstrate the capabilities of the IDT, FIG. 7 shows $R_{p(IPF)}$ for nanoparticles that vary between 30% and 0.1% in mobility with or less. However, to be able to separate a 0.01% one may use constant separation ratios of over 0.8. Due to the existing radial field, a separation ratio this high would most likely lead to the loss of the ions before reaching the end of the drift cell. In order to be able to use higher separation ratios, the nearly-stopping potential was used.

It has also been found that similar to FIG. 7, in some embodiments, NSP may use higher separation ratios for the same mobility when compared to the IPF. Without being limited to any theory, this is believed to be due to the autocorrecting feature of the IPF disappearing when a constant electric field is used. This point can be made quite clear for low mobilities. While initially increasing the separation ratio, Λ, may increase the resolving power, $R_p$, which may in turn increase until a maximum is reached at around Λ=0.9 and then drops for larger values. At these very large residence times (large separation ratios), the diffusion velocity becomes of the same order or higher than the movement velocity $\upsilon_m$ leading to a drop in $R_p$. However, the fact that the NSP can be used at higher separation ratios illustrates that NSP may also perform sufficient separation, such as IPF.

Figure 10:
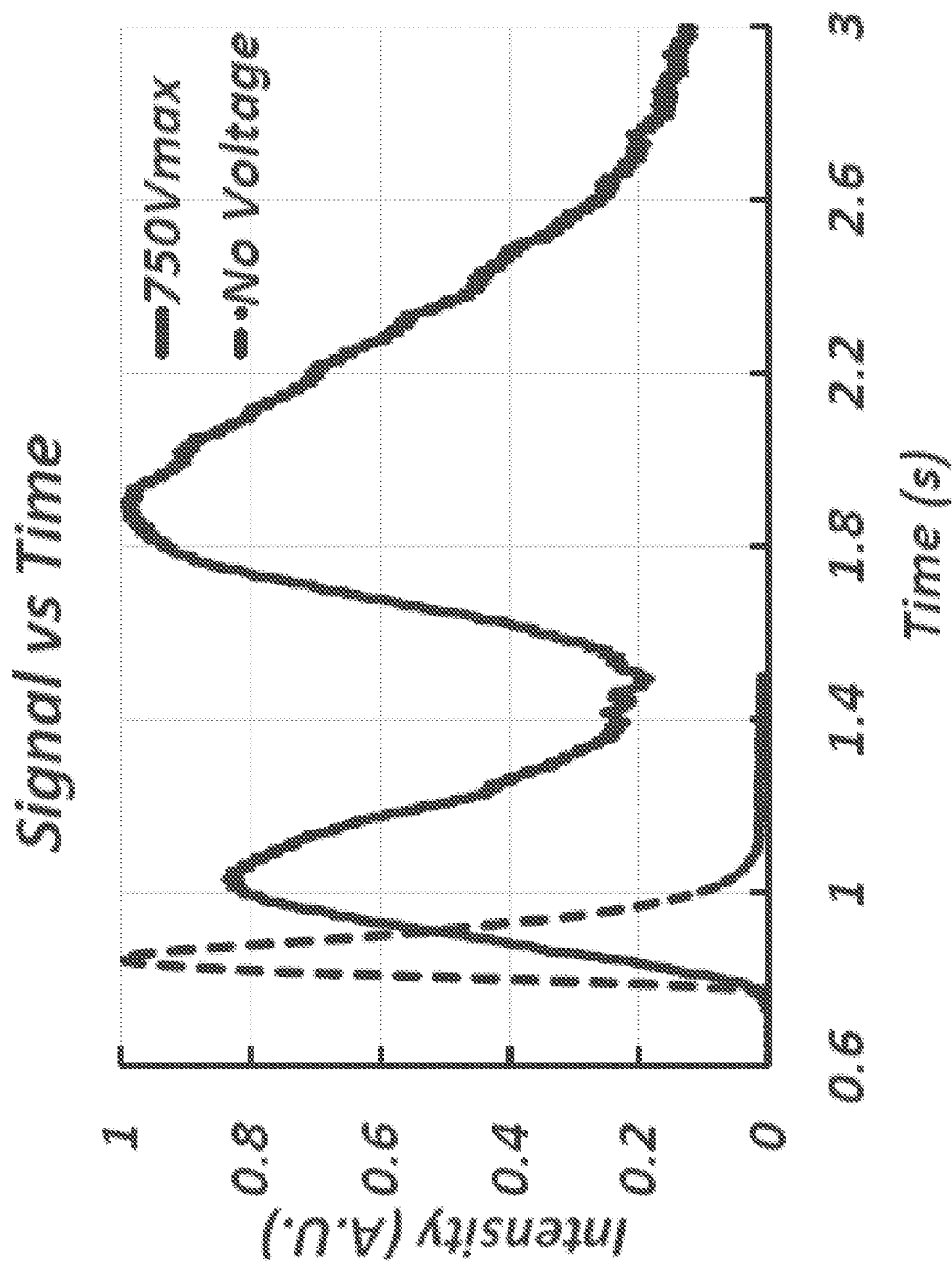
FIG. 10 illustrates sample data plotting transformation intensity as a function of time according to various embodiments.

The drift tubes and ion mobility particle analyzers, described above were modeled analytically as well as numerically and have been proven to be a very capable instruments and methods. For example, FIG. 10 illustrated the improved capability of an embodiment that used $750V_{max}$ to one with no voltage. As can be seen in FIG. 10, the two peaks were separated when $750V_{max}$ was used. In some embodiments, the plot in FIG. 10 may be converted from a plot of intensity vs. time to a plot of intensity vs. diameter.

Thus, various embodiments of the drift tubes, ion mobility spectrometers disclosed and exemplified above have demonstrated the ability to overcome some of the shortcomings of the previous conventional ion mobility spectrometers, in particular (a) diffusional broadening which leads to degradation of instrument resolution and (b) inadequate low and fixed resolution (not mobility dependent) for large sizes. For example, FIG. 9A illustrates and intermittent push flow DMA with a resolution of 10 and FIG. 9B illustrates an inverted drift tube DMA. As can be seen by comparing FIG. 9A with FIG. 9B, IDT-DMA is able to distinguish between two separate peaks, while the intermittent push flow DMA is not.

As described and shown herein, to overcome the diffusional broadening and have a mobility based resolution, the IDT uses two varying controllable opposite forces, a flow of gas with velocity $\upsilon_{gas}$, and second controllable velocity that, such as the exemplified linearly increasing electric field that opposes the movement. A new parameter, the separation ratio $\Lambda=\upsilon_{drift}/\upsilon_{gas}$, was employed to determine a possible separation for a given set of nanoparticles. Because the exemplified systems operated at room pressure or atmospheric pressure, two methods of capturing the ions at the end of the drift tube were exemplified, Intermittent Push Flow for a large range of mobilities, and Nearly-Stopping Potential Separation, with very high separation but limited only to a narrower mobility range.

Advantages of the various embodiments or aspects disclosed herein include:

(1) Analytical description of the 1D IDT problem for an initial distribution of nanoparticles has been shown to yield very high resolutions without any optimization. Resolution is close to being proportional to the square root of the length, but has a dampening effect on the standard deviation that increases the resolution several folds when compared to a drift tube. The resolution is also proportional to the mobility. In some embodiments, the lower the mobility, the higher the resolution.

(2) A 1D numerical simulation of the IDT shows in some embodiment an asymptotic value to the standard deviation for the intermittent push flow method. Regardless of the starting distribution, whether broad or narrow, the asymptotic behavior is achieved. The IDT has autocorrecting capabilities and fixes the diffusional broadening existing in other commercial instruments.

(3) 3D numerical simulations for single particle trajectories using stochastic diffusion in SIMION for the IDT were used to obtain resolutions of ions and separation ratios. Intermittent Push Flow resolutions acquired confirm qualitatively with those predicted analytically. For Nearly-Stopping Potential Separation, the modeling of the instrument is shown to be able to separate particles of 55.89 nm and 55.93 nm with ease. In various embodiments, this would allow for effective resolutions of several thousands.

(4) A chromatography existing concept of resolving power was also used to differentiate between peak resolution in the IDT and acceptable separation between similar mobility sizes (resolving power). It was shown that the IDT has a theoretically high resolving power for both intermittent push flow and nearly-stopping potential separation.

While this disclosure has been described as having an exemplary design, the present disclosure may be further modified within the spirit and scope of this disclosure. This application is therefore intended to cover any variations, uses, or adaptations of the disclosure using its general principles. Further, this application is intended to cover such departures from the present disclosure as come within known or customary practice in the art to which this disclosure pertains.

Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B or C may be present in a single embodiment; for example, A and B, A and C, B and C, or A and B and C.

In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art with the benefit of the present disclosure to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A drift tube comprising:
an inlet configured to receive ions; and
an outlet; and
an internal portion having a pressure at about atmospheric pressure, wherein
the drift tube is configured to separate ions using a convective velocity from a carrier gas that transports the ions from the inlet to the outlet, a second controllable velocity that alters a migration of the ions from the inlet to the outlet, and neither radio frequency (RF) nor an alternating current (AC) center the ions.

2. An ion mobility spectrometer comprising the drift tube of claim 1.

3. The drift tube of claim 1, wherein the force that produces the second controllable velocity is a gravitational force, a centripetal force, a centrifugal force, an electric field force, or a combination thereof.

4. The drift tube of claim 3, wherein the force that produces the second controllable velocity increases from the inlet to the outlet.

5. The drift tube of claim 4, wherein the increase in the force that produces the second controllable velocity is linear.

6. The drift tube of claim 1, wherein the force that produces the second controllable velocity alters a velocity of the ions traveling from the inlet of the drift tube to the outlet of the drift tube without stopping the transportation of the ions from the inlet of the drift tube to the outlet of the drift tube.

7. The drift tube of claim 6, wherein the force that produces the second controllable velocity is configured to provide a constant velocity of a desired ion.

8. The drift tube of claim 1, wherein the convective velocity is different than a drift velocity of the ion.

9. The drift tube of claim 1, wherein the force that produces the second controllable velocity controls the ions' diffusion in an axial direction of the drift tube.

10. The drift tube of claim 9, wherein the force that produces the second controllable velocity controls the ions' diffusion in an axial direction through auto-correction.

11. The drift tube of claim 1, wherein the force that produces the second controllable velocity and the convective velocity from a carrier gas controls the ions in opposite directions.

12. The drift tube of claim 1, wherein the drift tube is configured to separate ions having a particle size up to about 100 nm.

13. The drift tube of claim 1, wherein the drift tube is configured to separate ions having a particle size up to about 200 nm.

14. The drift tube of claim 1, wherein the drift tube is tapered.

15. A method of classifying charged particles comprising:
forming a plurality of charged particles,
transporting the plurality of charged particles in a drift tube,
separating the plurality of charged particles using a convective velocity from a carrier gas that transports the plurality of charged particles from an inlet of the drift tube to an outlet of the drift tube and a second controllable velocity that alters a migration of the ions from the inlet to the outlet, the second controllable velocity is produced by a force that is neither radio frequency (RF) nor an alternating current (AC); and detecting the separated plurality of charged particles, wherein an internal portion of the drift tube is at atmospheric pressure.

16. The method of claim 15, wherein the force that produces the second controllable velocity is a gravitational force, a centripetal force, a centrifugal force, an electric field force, or a combination thereof.

17. The method of claim 16, wherein the force that produces the second controllable velocity alters a velocity of the ions traveling from the inlet to the outlet without stopping the transportation of the ions from the inlet to the outlet.

18. The method of claim 16, wherein the force that produces the second controllable velocity controls the ions diffusion in an axial direction of the drift tube.

19. The method of claim 18, wherein the force that produces the second controllable velocity increases from the inlet to the outlet.

20. The method of claim 19, wherein the force that produces the second controllable velocity increases linearly.

21. The method of claim 16, wherein the plurality of charged particles have a particle size up to about 200 nm.

* * * * *